United States Patent Office 2,916,464
Patented Dec. 8, 1959

2,916,464

PRODUCTION OF POLYURETHANE FOAMS USING MOLYBDENUM COMPOUNDS AS CATALYSTS

Harold Ebneth, Leverkusen, Heinz Schultheis, Koln-Stammheim, and Herbert Nordt, Leverkusen, Germany, assignors, by mesne assignments, to Mobay Chemical Company, Pittsburgh, Pa., a corporation of Delaware No Drawing. Application May 23, 1957
Serial No. 661,000

Claims priority, application Germany December 6, 1956

7 Claims. (Cl. 260—2.5)

This invention relates to a process for producing polyurethane foam. More particularly, the invention is concerned with a process for making polyurethane foam wherein a small amount of a novel catalyst is used to accelerate the reactions resulting in the formation of the foamed plastic.

It has been proposed before to make cellular polyurethane plastics or, in other words, polyurethane foam by reacting a compound containing reactive hydrogen with a polyisocyanate and a small amount of water in the presence of suitable activators. Among the compounds containing reactive hydrogen which are generally used in the production of polyurethane foam, there may be mentioned linear and branched polyesters and polyester amides, polyalkylene ether glycols and polyalkylene ether-thioether glycols, all of which contain terminal hydroxyl and/or carboxyl groups and have an average molecular weight above about 1,000. As polyisocyanate reactant, there may be used an aliphatic or hydromatic polyisocyanate but it is preferred to employ aromatic polyisocyanates, such as the phenylene-, toluylene- and naphthylene-diisocyanates, or diisocyanates containing in their molecule two aromatic rings linked through a $CH_2$—, $CO$—, $SO_2$— or $N_2$ bridge, each of the aromatic rings bearing one isocyanato group. As activators there are commonly used tertiary amines and/or emulsifiers. If desired, fillers and other additives may be incorporated in the foamable mixture.

In producing a polyurethane foam from the above components, they may be brought together in different ways. Thus, it is possible to mix the compound containing the reactive hydrogen with the required amount of water and the activator and to subsequently add the polyisocyanate in order to form the polyisocyanate foam. It is also possible to introduce the three components, i.e., the compound containing reactive hydrogen, the polyisocyanate and water, through separate conduits into a mixing chamber. In both instances, it is preferred to inject at least one of the components into a stream of the other component(s) in order to bring about good mixing (see U.S. Patent 2,764,565). Alternatively, the compound containing reactive hydrogen may be reacted with excess polyisocyanate to produce an isocyanate-modified intermediate which is subsequently mixed with an aqueous activator mixture and, if desired, additional component containing reactive hydrogen to produce the polyurethane foam (see German Patent 929,507).

It has also been proposed to use along with basic activators nonbasic metal compounds in the production of polyurethane foam. In this manner, it is possible to obtain foams of great uniformity and without undesirable cracks or to produce foams with closed pores and relatively low densities, but the metal compounds heretofore utilized do not exercise a substantial accelerating effect on the foam formation. Polyurethane foam as obtained according to the heretofore known formulations remains tacky for a considerable period before it completely sets and cures to form a dry and nontacky product. In many instances, it takes a period as long as one hour or more from the time the expansion due to the $CO_2$ evolution has ceased and the foam has reached its maximum volume until the reactions accounting for the curing of the foam are terminated and a nontacky product is formed. Stated somewhat differently, the activators heretofore employed efficiently accelerate the first stage of the foam formation marked by the end of the $CO_2$ evolution and the expansion of the mass to a foamed plastic, but they leave much to be desired in their effect on the second stage of the foam formation during which a dry, processable end product is formed from a tacky, incompletely cured material.

It is, therefore, a primary object of the present invention to provide a process for the production of polyurethane foam which leads within a relatively short period to a nontacky end product. Another object of the invention is to provide a process for the production of polyurethane foam wherein the reactions responsible for setting and curing are greatly accelerated. A further object of the invention is to provide specific catalysts which when present in a reactive mixture capable of forming polyurethane foam considerably shorten the setting and curing time. A further object of the present invention is to provide a process for the production of polyurethane foam which does not require unreasonable long residence times of the material in the equipment used and is, therefore, particularly suitable for large scale operation. Still further objects will appear hereinafter.

These objects are attained in accordance with the present invention by carrying out the production of polyurethane foam in the presence of a small amount of a molybdenum compound which is at least partially soluble in one of the components used in the formulation of said polyurethane foam. The molybdenum compound to be used as accelerator in accordance with the instant invention can be added to any one of the components, i.e., polyhydroxy compound, polyisocyanate, water and tertiary amine, before the components are brought together. However, it is also possible to add the catalytic molybdenum compound to a previously prepared mixture of the components or the catalyst and other components may be mixed together simultaneously. If the production of the polyurethane foam is effected in two or more steps, the accelerating molybdenum compound can be added in any one of these steps, that is, the catalytic molybdenum compound need not be present in all the process steps to obtain the desired acceleration.

Any suitable molybdenum compound which is at least partially soluble in one of the components may be used as an accelerator in the process of the invention. Both organic and inorganic molybdenum compounds are included. Representative examples of suitable molybdenum compounds are, inter alia, ammonium molybdate, ammonium paramolybdate $((NH_4)_6Mo_7O_{24} \cdot 4H_2O)$, molybdenum pentachloride, and molybdenum bis-acetyl acetonate $(MoO_2(C_5H_7O_5)_2)$. Molybdenum compounds that are particularly useful in the process of the invention are molybdenum glycolates, such as are obtainable by mixing molybdenum oxide or hydrated molybdenum oxide with an excess of a polyvalent alcohol, such as a 1,2- or 1,3-diol, for example, ethylene glycol, the propylene glycols and the butylene glycols, heating the mixture to a temperature of about 100° to 200° C. until the molybdenum oxide or hydrated molybendum oxide is completely or at least partially dissolved, filtering the solution thus obtained from the insoluble residue, if any, and recovering the molybdenum glycolate formed from the solution by crystallization in the cold, precipitation with a non-solvent, such as acetone, or evaporation in vacuo. This method of obtaining molybendum glycolates is described in more detail in Patent 1,022,205 German and its foreign counterparts. A typical molybdenum glycolate of this type thus formed is the compound of the composition $C_4H_{10}O_6Mo$.

Another group of suitable molybdenum compounds are the complexes of molybdic acid with hydroxyl compounds other than glycols, such as alcohols, phenols, sugars, organic acids, diketones (enols) and the like. Finally, certain salts of molybdic acid, such as lithium molybdate, may be used to good advantage.

The molybdenum compounds used as catalysts in the process of the invention are effective in very small amounts. In general, 0.00001 to 0.1% by weight of molybdenum, based on the total weight of the reactants, will suffice to bring about the desired catalytic effect.

As indicated above, the molybdenum compound used to accelerate the foam formation can be added to any one of the components of the foam or to a mixture thereof. Rather than adding the molybdenum compound to a foam component, it is sometimes advisable to add the molybdenum compound to a reactant forming said foam component in order to incorporate it therein. Thus, if the polyurethane foam is produced from an hydroxyl polyester of the alkyd type, it is possible to add the molybdenum compound to the polycarboxylic acid or to the glycol from which the hydroxyl polyester is prepared. In this manner there is obtained a molybdenum-containing hydroxyl polyester that when reacted with a polyisocyanate and water will form a processable polyurethane foam in a much shorter time than a corresponding hydroxyl polyester not containing molybdenum.

It is well known that the production of polyurethane involves a complex series of chemical reactions. The first reaction in the preparation of polyurethane foam may be considered to be the formation of an adduct from the component-containing reactive hydrogen, for example, hydroxyl polyester, polyalkylene ether glycol or the like, and excess polyisocyanate, for example, toluylene diisocyanate. This reaction may be represented by the following equation in which the symbol — stands for the chain of the compound containing reactive hydrogen and R stands for a divalent radical

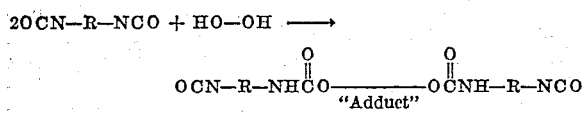

This adduct, or intermediate molecular weight addition product terminating in isocyanate groups, behaves like a polyisocyanate. When mixed with water, it will react in the usual way, giving off carbon dioxide, and becoming joined to another adduct molecule by a urea linkage:

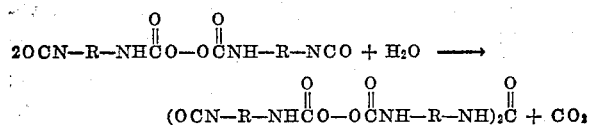

This reaction will continue as long as both isocyanate groups and water remain, building up long polymer chains. The above reactions lead only to the lengthening of the polymer chains, not cross-linking. However, an excess of polyisocyanate is used over that required to react with the water and the component containing reactive hydrogen. The use of this excess means that when all reactive groups have been consumed a few isocyanate groups will remain at the end of the polymer chains. These groups may react with urea or urethane groups within the polymer chain:

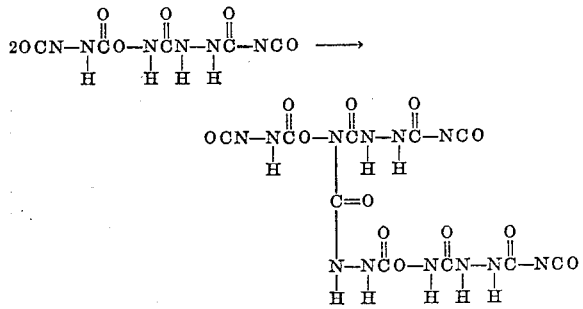

Such reactions can continue until all isocyanate groups are consumed and give branching of previously linear chains or cross-linking of previously branched chains.

It is believed that the molybdenum compounds used in accordance with the present invention specifically accelerate reactions between alcoholic OH groups and isocyanate groups resulting in the formation of urethane linkages. The reactions of the isocyanate groups with water and urea or urethane groups appear to be catalyzed to a much smaller extent, but in this respect we do not wish to be restricted to any particular theory.

As a practical matter, the use of molybdenum compounds in the production of polyurethane foam makes it possible to considerably shorten the reaction time. Thus, if with a given formulation the time required for the first stage of the foam formation marked by the end of the $CO_2$ evolution and of the expansion of the mass is in the order of about 2 minutes, it will be in the order of about 1 to 1.5 minutes in the presence of a catalytically acting molybdenum compound. The effect of the molybdenum compounds used in accordance with the instant invention is even greater in the second stage of the foam formation during which setting and curing take place and the tacky foam resulting from the first stage of the process is converted into a non-tacky processable end product. To give an example, with a typical foam formulation the second stage of the process may take 1 hour. However, when operating in the presence of a molybdenum compound according to the instant invention, this time may be shortened to 20 minutes.

It is apparent from the above that the process of the invention constitutes a decided advance over the prior art. Among the specific advantages obtained by the process of the invention, there may be listed (1) a considerable increase in the production rate of a given foam plant, (2) a considerable economy of storage space heretofore required to allow the tacky foam of the first stage to set and cure with formation of the non-tacky end product, (3) the possibility of mechanically processing the foam shortly after its formation, (4) the possibility of utilizing slow-reacting foam components which heretofore could not be employed because of insufficient reactivity and now can be put to use to produce foam of novel properties, (5) an improvement of certain mechanical characteristics of the foam, such as tensile strength and elongation.

The following examples, in which parts and percentages are by weight, illustrate the invention in more detail.

*Example 1*

Using known techniques, about 37.45 parts by weight adipic acid, about 28.78 parts by weight diethylene glycol, about 2.38 parts by weight trimethylolpropane and about 0.0032 part by weight ammonium molybdate are esterified and a polyester with an hydroxyl number of about 61.2, an acid number of about 1.6 and a viscosity of about 1050 centipoises (measured at about 73° C.) is obtained. While stirring at about 22° C., about 100 parts by weight of this molybdenum containing polyester are mixed with about 42 parts by weight toluylene diisocyanate (a mixture of about 80% 2,4-toluylene diisocyanate and about 20% 2,6-tolylene diisocyanate) and about 9.7 parts by weight activator. The latter consists of a mixture of about 2 parts by weight N-ethylmorpholine, about 2 parts by weight polyethoxylated castor oil, about 2.5 parts by weight oleic acid, about 0.2 part by weight paraffin oil and about 3 parts by weight water. Within about 55 seconds, a non-shrinking foam with a density of about 35 kg./cu. m. is obtained. It is set after about 22–25 minutes at about 22° C., after about 2 minutes at about 80° C., i.e., after this length of time the skin of the foam is no longer tacky. Without the addition of the molybdenum, the foam is finished only after about 85 seconds and is set after about 45–50 minutes at about 22° C. or after about 8 minutes at about 80° C.

Example 2

Using known techniques, about 37.45 parts by weight adipic acid, about 28.78 parts by weight diethylene glycol and about 2.38 parts by weight trimethylol propane are esterified, and a polyester A with an hydroxyl number of about 61.2, an acid number of about 1.6 and a viscosity of about 1,050 centipoises (measured at about 73° C.) is obtained. In addition, about 36.32 parts by weight adipic acid are esterified with about 28.78 parts by weight diethylene glycol using known techniques, and a polyester B with an hydroxyl number of about 43.5, an acid number of about 0.78 and a viscosity of about 813 centipoises (measured at about 73° C.) is obtained. A mixture of about 30% polyester A and about 70% polyester B is prepared and about 100 parts by weight of this polyester mixture are mixed with about 39.4 parts by weight tolylene diisocyanate (mixture of about 80% 2,4-tolylene diisocyanate and about 20% 2,6-tolylene diisocyanate) and about 8.5025 parts by weight activator mixture while stirring at about 22° C. The latter is comprised of a mixture of about 3.0 parts by weight N-ethylmorpholine, about 1.5 parts by weight of an emulsifier (polyalcoholcarboxylic acid ester with a sulfonated vegetable oil), about 1.0 part by weight oleate of diethylamine, about 0.0025 part by weight molybdenum glycolate and about 3.0 parts by weight water. After mixing the reaction components, a finished foam is obtained within about 55 seconds at about 22° C. and is set and able to be removed from the mold within about 22–25 minutes at about 22° C., at about 80° C., however, it is already set in about 2 minutes, i.e., after this length of time the skin of the foam is no longer tacky. Without the addition of the molybdenum catalyst, a finished foam is obtained only after about 75–80 seconds, and is set after about 60 minutes at about 22° C.; at about 80° C., it is set only after about 12 minutes.

Example 3

To about 3,000 parts of a polyester made from adipic acid, diethylene glycol and trimethylolpropane, with an hydroxyl number of about 59.0, an acid number of about 1.1, and a viscosity of about 1,063 centipoises (measured at about 73° C.) are added about 1,800 parts of a mixture of 2,4-tolylene diisocyanate and 2,6-tolylene diisocyanate in an 80:20 ratio at about 60° C. followed by heating for about 90 minutes at about 80° C. At the end of this time, an isocyanate containing reaction product with an NCO content of about 15.6% and a viscosity of about 7,600 centipoises (measured at about 78° C.) is obtained. To about 200 parts of this reaction product are added and mixed homogeneously about 4 parts of N-cocomorpholine which contains about 14 carbon atoms in the alkyl residue, about 0.5 part of a polyethoxyl ester as emulsifier, about 4.5 parts water, about 30.0 parts of a polyester obtained from adipic acid, hexanetriol, 1,3-butylene glycol, phthalic anhydride and maleic anhydride with about a 4.8% hydroxyl content and also about 0.005 part molybdenum glycolate dissolved in about 0.5 part water. This mixture is charged into a mold and heated for about 20 minutes at about 50° C. After this length of time, an elastic foam has formed which can be removed from the mold without suffering any damage. In the production of a foam of like composition without the use of molybdenum glycolate, about 40 minutes heating is necessary to enable the foam to be removed from the mold without damage.

Example 4

Using known techniques, about 1 mol adipic acid, about 2 mols phthalic anhydride, about 1 mol oleic acid and about 5 mols glycerine are esterified and a polyester with an hydroxyl number of about 379.1, an acid number of about 0.35 and a viscosity of about 1,310 centipoises (measured at about 73° C.) is obtained. While stirring at about 55–59° C., about 100 parts of this polyester and about 20 parts trichloroethyl phosphate and about 8.065 parts activator mixture are mixed with about 90 parts of tolylene diisocyanate (mixture of about 65% 2,4-tolylene diisocyanate and about 35% 2,6-tolylene diisocyanate). The activator mixture consists of about 3.0 parts N-diethylaminoethoxybenzene, about 4.0 parts of about 54% aqueous sulfonated castor oil with an acid number of about 11, about 0.005 part molybdenum glycolate and about 1.06 parts water. A very quickly hardened rigid foam with a density of about 25 kg./cu. m. is obtained.

Example 5

In about 100 grams of a polyester prepared according to Example 1 from adipic acid, diethylene glycol and trimethylolpropane are dissolved about 10 mg. molybdenyl bis-acetylacetonate, $MoO_2(C_5H_7O_2)_2$. Then, about 36 grams tolylene diisocyanate and about 7.5 grams of an activator mixture of the following composition: about 3 grams of an adipic acid bis-diethylaminoethanol ester, about 1.5 grams diethylammonium oleate, about 1.5 grams of about a 54% castor oil sulfate solution and 1.5 grams water, are mixed with the polyether at room temperature. In about 45 seconds, a foam is obtained which is set after about 6 minutes and, at a density of about 48 kg./cu. m., has a tensile strength of about 1.3 kg./sq. cm. A like mixture without molybdenum catalysis requires about 85 seconds reaction time, about 9 minutes for setting, and has a density of about 54 with a tensile strength of about 0.90 kg./sq. cm.

Example 6

Proceeding as in Example 5, about 10 mg. ammonium molybdate are used instead of the molybdenyl bis-acetylacetonate and are dissolved in the aqueous activator mixture. The reaction period is about 30 seconds, the setting period about 3 minutes, the density of the foam about 41 and its tensile strength about 1.70 kg./sq. cm.

Example 7

A mixture is prepared from about 100 grams of a polythioether, which can be made by known processes, of thiodiglycol and bis(hydroxyethoxy)butane, i.e., $$HO-(CH_2)_2-O-(CH_2)_4-O-(CH_2)_2-OH$$

having an hydroxyl number of about 55, and about 34 grams tolylene diisocyanate and an activator mixture of the following composition: about 2 grams adipic acid-bis-diethylaminoethanol ester, about 1.5 grams diethylammonium oleate, about 2 grams of about a 54% aqueous castor oil sulfate solution, about 1.5 grams water and about 10 mg. molybdenum glycolate. The reaction time is about 43 seconds, the setting time about 6 minutes, the density about 43 and the tensile strength about 1.80 kg./sq. cm. Without the molybdenum addition, the foaming lasts about 70 seconds, the setting time 10 minutes; the density is about 55 and the tensile strength is about 1.30 kg./sq. cm.

The present invention is applicable to the production of polyurethane foams of all kinds. A rather substantial volume of literature has developed in the last ten years or so in connection with the production of polyurethane foam of which among the earliest are a book entitled "German Plastics Practice" by De Bell et al. (1946), pages 316 and 463 to 465, and the articles by Otto Bayer in "Angew. Chemie," A 59, 257 (1947) and "Modern Plastics," 24, 149 (1947). However, in order to provide sufficient detail with respect to specific starting materials that are especially useful to make polyurethane foam and at the same time achieve a certain degree of brevity herein, reference is made to the aforesaid U.S. Patent 2,764,565 and German Patent 929,507, the disclosure of which is hereby incorporated herein by reference.

While certain representative embodiments and details have been shown for the purpose of illustrating this invention, it will be apparent to those skilled in the art that various changes and modifications may be made therein without departing from the spirit and scope of the invention.

What is claimed is:

1. In the preparation of a cellular polyurethane by a process which comprises reacting an organic polyisocyanate, water and an organic compound having hydrogen atoms reactive with an —NCO group selected from the group consisting of a polyester prepared by esterification of a polycarboxylic acid and a polyhydric alcohol, a polyalkylene ether glycol and a polythioether glycol, said group members having a molecular weight of above about 1,000, the improvement which comprises effecting the said reaction while the said reactants are in admixture with a catalytic amount of a member selected from the group consisting of ammonium molyddate, ammonium paramolybdate, molybdenum bis-acetyl acetonate, a molybdenum glycolate, and an alkali metal salt of molybdic acid, and a tertiary amine.

2. The process of claim 1 wherein the molybdenum compound is a molybdenum glycolate.

3. The process of claim 1 wherein compound having reactive hydrogens is a polyester prepared by esterification of a polycarboxylic acid and a polyhydric alcohol.

4. The process of claim 1 wherein the organic compound having reactive hydrogens is a polyalkylene ether glycol.

5. The process of claim 1 wherein said reaction is effected while the reactants are in admixture with from about 0.00001% to about 0.1% of one of the said molybdenum compounds.

6. In the preparation of a cellular polyurethane by a two-step process in which an organic polyisocyanate and an organic compound having hydrogen atoms reactive with an —NCO group selected from the group consisting of a polyester prepared by esterification of a polycarboxylic acid and a polyhydric alcohol, a polyalkylene ether glycol and a polythioether glycol, said group members having a molecular weight of above about 1,000, are reacted together in a first step to form an —NCO terminated prepolymer and the prepolymer is then reacted in a second step with water, the improvement which comprises effecting the said reaction with water while the reactants are in admixture with a catalytic amount of a member selected from the group consisting of ammonium molybdate, ammonium paramolybdate, molybdenum bis-acetyl acetonate, a molybdenum glycolate and an alkali metal salt of molybdic acid, and a tertiary amine.

7. The process of claim 6 wherein the molybdenum compound is a molybdenum glycolate.

No references cited.

UNITED STATES PATENT OFFICE
CERTIFICATE OF CORRECTION

December 8, 1959

Patent No. 2,916,464    Harold Ebneth et al.

It is hereby certified that error appears in the above numbered patent requiring correction and that the said Letters Patent should read as corrected below.

In the grant, lines 3 and 4, for "assignors, by mesne assignments, to Mobay Chemical Company, of Pittsburgh, Pennsylvania, a corporation of Delaware," read -- assignors, by direct and mesne assignments, of one-half to Farbenfabriken Bayer Aktiengesellschaft, of Leverkusen, Germany, a corporation of Germany, and one-half to Mobay Chemical Company, of Pittsburgh, Pennsylvania, a corporation of Delaware --; line 13, for "Mobay Chemical Company, its successors" read -- Farbenfabriken Bayer Aktiengesellschaft and Mobay Chemical Company, their successors --; in the heading to the printed specification, lines 7, 8 and 9, for "assignors, by mesne assignments, to Mobay Chemical Company, Pittsburgh, Pa., a corporation of Delaware" read -- assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware --.

Signed and sealed this 17th day of May 1960.

(SEAL)
Attest:
KARL H. AXLINE
Attesting Officer

ROBERT C. WATSON
Commissioner of Patents